United States Patent
Breitfeld et al.

(10) Patent No.: US 6,527,261 B2
(45) Date of Patent: Mar. 4, 2003

(54) HYDRAULICALLY DAMPING ELASTOMERIC BEARING

(75) Inventors: Thorsten Breitfeld, Boeblingen (DE); Klaus-Thomas Hettich, Karlsruhe (DE); Bernd Koeder, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/907,983

(22) Filed: Jul. 18, 2001

(65) Prior Publication Data

US 2002/0079628 A1 Jun. 27, 2002

(30) Foreign Application Priority Data

Jul. 19, 2000 (DE) .......................................... 100 35 026

(51) Int. Cl.⁷ ............................ F16F 13/00; F16F 15/00; F16F 5/00; F16F 9/00
(52) U.S. Cl. ............................ 267/140.13; 267/140.12; 267/293
(58) Field of Search ............................ 267/64.11, 64.13, 267/122, 140.11, 140.13, 140.12, 292, 293, 140.14, 140.15, 141.2, 141.3

(56) References Cited

U.S. PATENT DOCUMENTS

| 3,642,268 | A | * | 2/1972 | Hipsher ........................ 267/281 |
| 4,877,225 | A | * | 10/1989 | Noguchi et al. ......... 267/140.14 |
| 5,037,073 | A | * | 8/1991 | Matsumoto et al. ...... 267/140.2 |
| 5,246,211 | A | * | 9/1993 | Klein et al. ............. 267/140.13 |
| 5,310,169 | A | * | 5/1994 | Kojima .................... 267/140.14 |
| 5,516,083 | A | * | 5/1996 | Sprang et al. .......... 267/140.12 |
| 5,992,833 | A | * | 11/1999 | Tanahashi ............... 267/140.14 |
| 6,158,724 | A | * | 12/2000 | Takashima et al. ..... 267/140.13 |
| 6,176,477 | B1 | * | 1/2001 | Takeo et al. ........... 267/140.11 |
| 6,364,295 | B1 | * | 4/2002 | Wolf et al. ............. 267/140.14 |
| 6,390,459 | B2 | * | 5/2002 | Saitoh .................... 267/140.13 |

FOREIGN PATENT DOCUMENTS

DE  38 21 240  1/1989

* cited by examiner

Primary Examiner—Christopher P. Schwartz
Assistant Examiner—Devon Kramer
(74) Attorney, Agent, or Firm—Kenyon & Kenyon

(57) ABSTRACT

A hydraulically damping elastomeric bearing, which is suitable for mountings in a motor vehicle, includes an elastic connecting body which is arranged between a first bearing component and a second bearing component and connects these elastically to one another. Two chambers which are filled with a liquid damping medium communicate with one another via at least one throttle duct. To generate a specific damping characteristic, at least two throttle ducts are provided, which connect the two chambers to one another, the first throttle duct containing an absorber which is adjusted as a function of pressure differences between the chambers in the first throttle duct, the absorber controlling the opening cross-section of the second throttle duct as a function of its adjusting movements.

16 Claims, 3 Drawing Sheets

HYDRAULICALLY DAMPING ELASTOMERIC BEARING

FIELD OF THE INVENTION

The present invention relates to a hydraulically damping elastomeric bearing suitable for mountings in a motor vehicle.

BACKGROUND INFORMATION

German Published Patent Application No. 38 21 240 describes an elastomeric bearing, in which an elastic connecting body, for example, made of an elastic or elastomeric plastic or rubber, is arranged between a sleeve-shaped outer first bearing component and an inner second bearing component coaxial to the latter. With the aid of this connecting body, an elastic connection between the first bearing component and the second bearing component is made, which allows relative movements between the bearing components. The conventional elastomeric bearing also includes two chambers which are filled with a liquid damping medium and communicate with one another via a throttle duct. Elastomeric bearings of this type are used in order to mount a vibrating assembly on a non-vibrating holding device. The elastomeric bearings serve, in this context, for vibration insulation or vibration damping. For example, elastomeric bearings of this type are used in vehicle construction, in order to mount vehicle axles, a transmission or an engine on the vehicle body. In this case, one of the bearing components is connected to the vibrating assembly, while the other bearing component is coupled to the non-vibrating holding device. The vibrations of the assembly result in relative movements between the bearing components which reduce the volume of one chamber and at the same time increase the volume of the other chamber. In this case, the liquid damping medium is exchanged correspondingly between the chambers via the throttle duct. The throttling action of the throttle duct results, under these circumstances, in a damping of the relative movement and therefore in a damping of the vibrations capable of being transmitted between the sleeves.

The vibrations to be damped by an elastomeric bearing may have different characteristics, depending on the application. For example, in an elastomeric bearing which is installed in a motor vehicle, vibrations of low frequency and high amplitude, such as, for example, engine shaking vibrations and idling vibrations, may occur, and even high-frequency vibrations of low amplitude which result, for example, in a drumming noise within a passenger compartment of the motor vehicle. The abovementioned German Published Patent Application No. 38 21 240 describes an elastomeric bearing which sufficiently damps both vibrations of low frequency and high amplitude and vibrations of high frequency and low amplitude.

In another application, it may, for example, be necessary to design the elastomeric bearing so that smaller relative movements between the bearing components are damped to a greater extent than larger relative movements. For example, by an elastomeric bearing which is installed in a vehicle, vibrations generated by the vehicle engine are to be damped to a greater extent than vibrations which are caused during the braking or acceleration of the vehicle or by road unevennesses.

It is an object of the present invention to provide an elastomeric bearing that has a different damping behavior for relatively small relative movements between the bearing components from that for relatively large relative movements.

SUMMARY

The above and other beneficial objects of the present invention are achieved by providing an elastomeric bearing as described herein. In one example embodiment of the present invention, two chambers of the elastomeric bearing are connected to one another via at least two throttle ducts, one throttle duct containing an absorber which controls the passage or opening cross-section of the other throttle duct. The absorber is mounted in the first throttle duct so as to be adjustable in the longitudinal direction of the throttle duct, the absorber being adjusted as a function of pressure differences at the ends of the first throttle duct and therefore as a function of pressure differences between the chambers connected by the first throttle duct. Pressure differences between the chambers are generated by relative movements between the bearing components. Relative movements between the bearing components correspondingly result in adjustment movements of the absorber. On account of the absorber mass, a specific damping action is thus obtained.

The absorber may, for example, cooperate with the second throttle duct so that, in the case of relatively small relative movements between the bearing components, the absorber blocks the passage cross-section of the second throttle duct, so that the latter does not allow any exchange of damping medium between the chambers. Only when larger relative adjustments occur between the bearing components does the absorber control the passage cross-section of the second throttle duct so that the latter opens to a greater or lesser extent. Correspondingly, in the case of larger relative movements, an exchange of damping medium between the chambers may occur to a greater or lesser extent through the second throttle duct. The result of this is that the elastomeric bearing therefore has a different damping action in the case of larger relative movements between its bearing components from that in the case of smaller relative movements.

In an example embodiment of the present invention, the absorber frees the opening cross-section of the second throttle duct to a greater or lesser extent in the case of smaller relative movements and closes it only in the case of larger relative movements.

The second throttle duct may include a first inlet orifice assigned to the first chamber and a first outlet orifice assigned to the second chamber, the first inlet orifice being connected to the first throttle duct and being controlled by the absorber. By virtue of this arrangement, the control of the inlet orifice or opening cross-section of the inlet orifice may be implemented in a particularly simple manner, since the inlet orifice to be controlled is arranged in the vicinity of the absorber.

The second throttle duct may also include a second inlet orifice assigned to the second chamber and a second outlet orifice assigned to the first chamber, the second inlet orifice being connected to the first throttle duct and being controlled by the absorber. A relatively simple configuration is obtained because of the vicinity of the absorber to the second inlet orifice. In addition, the absorber or the control of the absorber may be configured so that the absorber keeps the first inlet orifice open and the second inlet orifice closed in the case of a sufficient excess pressure in the first chamber and keeps the first inlet orifice closed and the second inlet orifice open in the case of a sufficient excess pressure in the second chamber. In addition, the first outlet orifice may include a first non-return valve which blocks a flow through the second throttle duct from the first outlet orifice to the first inlet orifice and allows a flow from the first inlet orifice to the first outlet orifice. Moreover, the second outlet orifice may include a second non-return valve which blocks a flow through the second throttle duct from the second outlet orifice to the second inlet orifice and allows a flow from the second inlet orifice to the second outlet orifice. The selected alternate control of the two inlet orifices by the absorber and the selected arrangement of the non-return valves ensure that the flow may pass through the second throttle duct in both directions, the control of the throughflow cross-section being implemented by the absorber simultaneously for both directions of throughflow. A form of construction of this type may be made highly compact.

Alternatively, in an example embodiment of the present invention, the first throttle duct includes the absorber, the second throttle duct includes a first inlet orifice assigned to the first chamber and a first outlet orifice assigned to the second chamber, the first inlet orifice being connected to the first throttle duct and being controlled by the absorber, and a third throttle duct is provided, which connects the two chambers in parallel to the first throttle duct and to the second throttle duct and which has a second inlet orifice assigned to the second chamber and a second outlet orifice assigned to the first chamber, the second inlet orifice being connected to the first throttle duct and being controlled by the absorber. The absorber is configured so that it keeps the first inlet orifice open and the second inlet orifice closed in the case of a sufficient excess pressure in the first chamber and keeps the first inlet orifice closed and the second inlet orifice open in the case of a sufficient excess pressure in the second chamber. This example embodiment of the present invention, in contrast to that described above, manages without non-return valves, so that a simpler construction is obtained for the elastomeric bearing. This example embodiment of the present invention may include non-return valves which are accommodated in the second throttle duct or in the third throttle duct.

In the elastomeric bearing according to the present invention, at least one of the non-return valves may configured as an excess-pressure valve and allow a flow through the respective throttle duct from the respective inlet orifice to the associated outlet orifice only beyond a predetermined excess pressure on the inlet side. The damping characteristic of the elastomeric bearing may be additionally influenced as a result of this arrangement.

The first inlet orifice may issue into the first throttle duct within the range of adjustment of a first end portion, assigned to the first chamber, of the absorber, the throughflow opening cross-section of the first inlet orifice being controlled by a greater or lesser overlap by the first absorber end portion. The absorber thereby directly controls the first inlet orifice and therefore the opening cross-section of the second throttle duct. A throttle duct arrangement of this type may have a particularly compact construction.

The second inlet orifice may issue into the first throttle duct within the range of adjustment of a second end portion, assigned to the second chamber of the absorber, the throughflow opening cross-section of the second inlet orifice being controlled by a greater or lesser overlap by the second absorber end portion. Particularly in combination with the features of the abovementioned example embodiment of the present invention, this arrangement results in a particularly compact form of construction for the throttle duct arrangement.

According to another example embodiment of the present invention, the absorber may be prestressed into an initial position by a spring device. A predetermined initial position is defined with the aid of this arrangement, as a result of which the damping behavior of the elastomeric bearing may be reproduced.

The initial position of the absorber may be selected such that, in this initial position, the absorber closes both inlet orifices. Correspondingly, in both possible directions of movement of the relative movements between the two bearing components, first only the damping action of the first throttle duct, with the absorber adjustable in it, is activated, while, in the event of larger relative adjustments, i.e., in the event of greater pressure differences, the throttling action of the second throttle duct or the third throttle duct, if present, is activated.

Where a particularly compact form of construction is concerned, the first outlet orifice may be connected to the first throttle duct, the first outlet orifice then issuing into the first throttle duct outside the range of adjustment of a second end portion, assigned to the second chamber, of the absorber. In addition, the second outlet orifice may also be connected to the first throttle duct, in which case the second outlet orifice also issues into the first throttle duct outside the range of adjustment of a first end portion, assigned to the first chamber, of the absorber. This arrangement results in a compact form of construction for the throttle duct arrangement.

The features mentioned above and those explained below may be used not only in the combination specified in each case, but also in other combinations or alone, without departing from the scope of the present invention.

DETAILED DESCRIPTION

Figure 1:
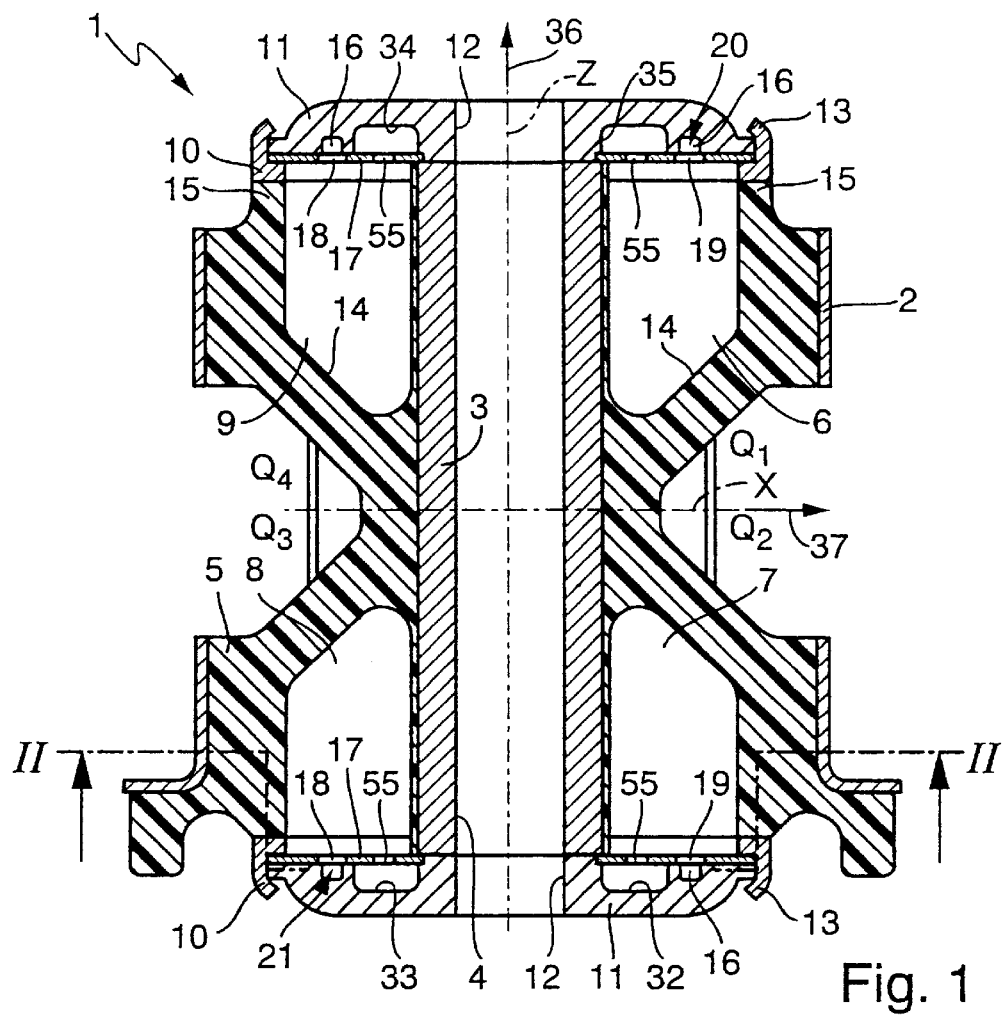
FIG. 1 is a schematic longitudinal cross-sectional view of an example embodiment of an elastomeric bearing according to the present invention.

As illustrated in FIG. 1, an elastomeric bearing 1 includes a sleeve-shaped first bearing component 2 and, coaxially thereto, a second bearing component 3 having an axial central passage orifice 4. Arranged radially between the first bearing component 2 and the second bearing component 3 is an elastic or elastomeric connecting body 5 which connects the two bearing components 2 and 3 elastically to one another. For example, the connecting body 5 may be vulcanized onto one of the bearing components or onto both bearing components 2, 3. Furthermore, the elastomeric bearing 1 includes four chambers 6, 7, 8 and 9 which are filled with a liquid damping medium. In the example embodiment of the present invention illustrated in FIG. 1, to form the chambers 6 to 9 in each axial half of the connecting body 5, corresponding recesses are cut out in an axially outer region of the connecting body 5, so that the chambers 6 to 9 are delimited radially inwardly and radially outwardly and also axially inwardly by elastic wall material of the connecting body 5.

As illustrated in FIG. 1, the four chambers 6 to 9 are arranged in one plane, e.g., in the drawing plane or the sectional plane of FIG. 1. In this plane is a system of coordinates including two axes which are perpendicular to one another and are designated by X and Z. In this case, the Z-axis runs coaxially and concentrically to the bearing components 2 and 3. The two axes X and Z form four quadrants Q1, Q2, Q3 and Q4 in the XZ-plane. One of the chambers 6 to 9 is arranged in each of these quadrants Q1 to Q4. In the example embodiment of the present invention illustrated, the chambers 6 to 9 are arranged mirror-symmetrically both with respect to the Z-axis and with respect to the X-axis. The axes X and Z may also intersect at an angle different from 90°.

As illustrated in FIG. 1, a ring 10 of L-shaped cross-section is attached, e.g., vulcanized, to the axial ends of the connecting body 5. Disc-shaped covers 11 are fastened to the axial ends of the second bearing component 3, each of these covers 11 including a central orifice 12 which is in alignment with the-passage orifice 4 of the second bearing component 3. The covers 11 are inserted into one of the rings 10 and fastened thereto, this arrangement being achieved by an axially projecting collar 13 of the ring 10 being bent and positively engaged over.

Each cover 11 is thus assigned to one half of the connecting body 5 and accordingly closes axially outwardly the chambers 6, 9 and 7, 8 assigned to this half of the connecting body 5.

In an axially inner portion, the chambers 6 to 9 are configured in longitudinal section, as illustrated in FIG. 1, so that they narrow triangularly axially inwardly. The cross-section is substantially constant axially outwardly. In the event of a relative adjustment between the first bearing component 2 in relation to the second bearing component 3, during which, for example, the second bearing component 3 moves upwardly as illustrated in FIG. 1, the radially inner wall of the upper chambers 6 and 9 is adjusted upwardly and at the same time takes up the axially inner end of the chambers 6 and 9. As a result, a radially outer wall region 14 of the axially inner end of the chambers 6, 9 is adjusted out of the initial position illustrated in FIG. 1, in which the wall region 14 is inclined at approximately 45° to the Z-axis, in the direction of a level position in which the wall region 14 extends approximately parallel to the X-axis. Simultaneously, a radially and axially outer wall portion 15 of the connecting body 5 is adjusted axially outwardly by virtue of it being coupled to the ring 10. In this case, the increase in volume of the upper chambers 6 and 9 in their axially outer region is markedly greater than, e.g., approximately twice as great as, the decrease in volume in the axially inner region. A corresponding change in volume occurs in a similar manner with regard to the lower chambers 7 and 8.

Figure 2:
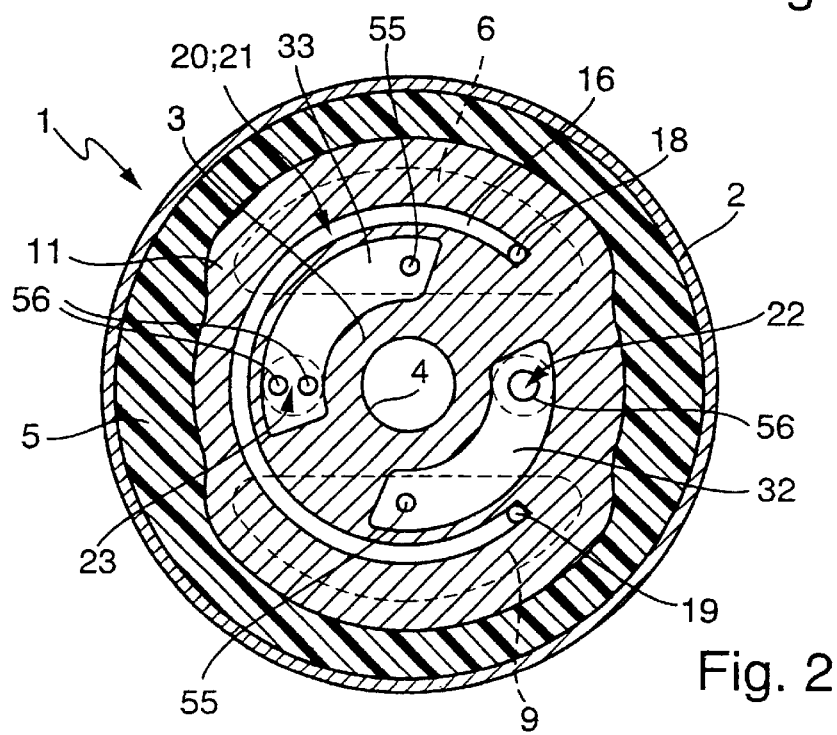
FIG. 2 is a schematic cross-sectional view of the elastomeric bearing illustrated in FIG. 1 taken along the line II—II.

Incorporated in each cover 11, in an inner face confronting the chambers 6 to 9, is a groove 16 which, as illustrated in FIG. 2, extends in the form of a segment of an annulus. This groove 16 is closed by a disc 17 which is attached to the cover 11 on the inner face thereof. This disc 17 thus closes the groove 16 axially outwardly and the respectively associated chambers 6, 9 and 7, 8 axially inwardly. In the region of the ends of the groove 16, this disc 17 has formed in it an orifice 18, 19, via which the groove 16 may communicate with the respectively associated chambers 6, 9 and 7, 8. Accordingly, the groove 16 assigned to the chambers 6 and 9 illustrated at the top in FIG. 1 forms a first throttle duct arrangement 20, via which the two chambers 6 and 9 may communicate with one another. In contrast, the groove 16 assigned to the chambers 7 and 8 illustrated at the bottom in FIG. 1 forms a second throttle duct arrangement 21, via which the lower chambers 7 and 8 may communicate with one another.

Figure 3:
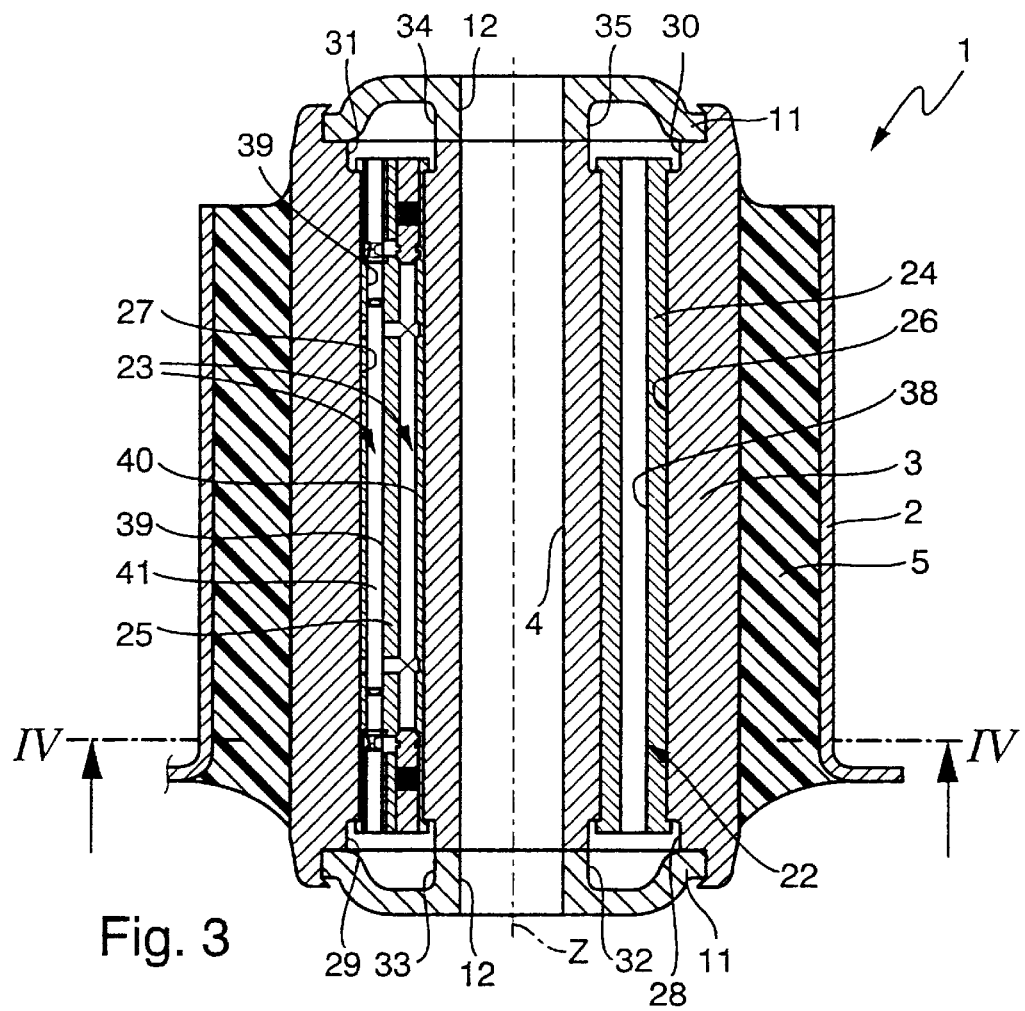
FIG. 3 is a schematic longitudinal cross-sectional view of another example embodiment of an elastomeric bearing according to the present invention.
Figure 4:
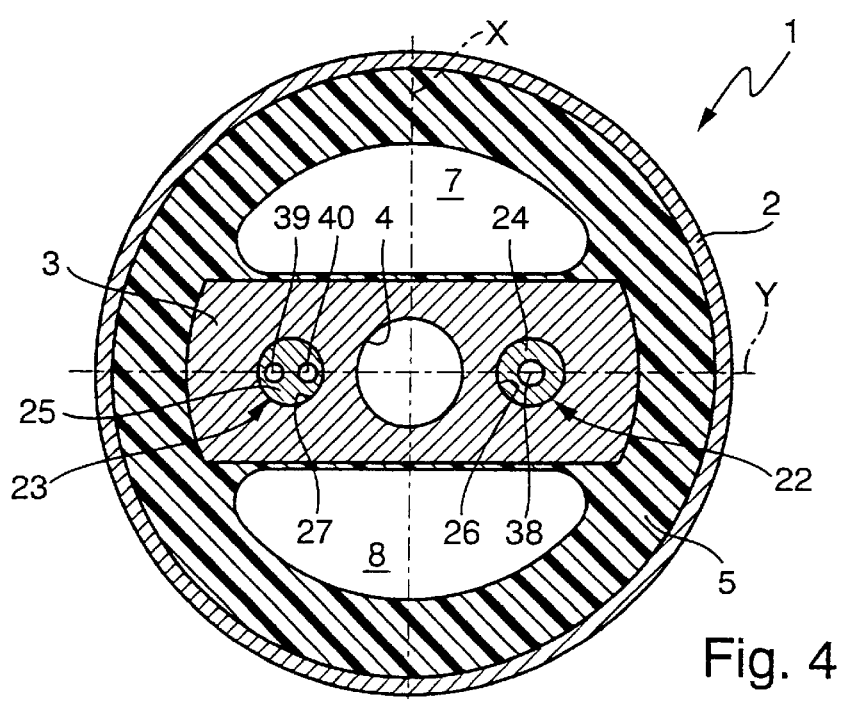
FIG. 4 is a schematic cross-sectional view of the elastomeric bearing illustrated in FIG. 3 taken along the line IV—IV.

As illustrated in FIGS. 2, 3 and 4, two further throttle duct arrangements are formed in the second bearing component 3, e.g., a third throttle duct arrangement 22 and a fourth throttle duct arrangement 23. These throttle duct arrangements 22 and 23 extend parallel to the longitudinal axis Z of the second bearing component 3. The throttle duct arrangements 22 and 23 are formed in an insertion part 24 and 25 which is inserted into a corresponding insertion orifice 26 and 27, the corresponding insertion orifices 26 and 27 being formed in the second bearing component 3.

Each of these throttle duct arrangements 22 and 23 connects one of the chambers 6 to 9 of one half of the connecting body 5 to one of the chambers 6 to 9 of the other half of the connecting body 5. For example, the third throttle duct arrangement 22 connects the chambers 6 and 7, illustrated on the right in FIG. 1, to one another, while the fourth throttle duct arrangement 23 couples the chambers 8 and 9, illustrated on the left in FIG. 1, to one another.

The arrangement of the four chambers 6 to 9 and the coupling of these by the four throttle duct arrangements 20 to 23 may therefore be described as follows: The chamber 6 of the first quadrant Q1 is connected via the first throttle duct arrangement 20 to the chamber 9 of the fourth quadrant Q4 and via the third throttle duct arrangement 22 to the chamber 7 of the second quadrant Q2. The chamber 7 of the second quadrant Q2 is connected via the third throttle duct arrangement 22 to the chamber 6 of the first quadrant Q1 and via the second throttle duct arrangement 21 to the chamber 8 of the third quadrant Q3. Moreover, the chamber 8 of the third quadrant Q3 is coupled via the second throttle duct arrangement 21 to the chamber 7 of the second quadrant Q2 and via the fourth throttle duct arrangement 23 to the chamber 9 of the fourth quadrant Q4. Finally, the chamber 9 of the fourth quadrant Q4 is connected via the fourth throttle duct arrangement 23 to the chamber 8 of the third quadrant Q3 and via the first throttle duct arrangement 20 to the chamber 6 of the first quadrant Q1.

Therefore, each of the four chambers 6 to 9, which is arranged on a first side of the X-axis, is connected to a chamber 6 to 9 which is arranged on a second side of the X-axis, and, moreover, each of the chambers 6 to 9 which is arranged on a first side of the Z-axis is connected to a chamber 6 to 9 which is arranged on a second side of the Z-axis. Furthermore, each chamber 6 to 9 which is arranged on the first side of the X-axis and on the first side of the Z-axis is connected via one of the throttle duct arrangements 20 to 23 to another chamber 6 to 9 which is arranged on the first side of the X-axis and on the second side of the Z-axis and via another of the throttle duct arrangements 20 to 23 to a further chamber 6 to 9 which is arranged on the second side of the X-axis and on the first side of the Z-axis.

In order to couple the third throttle duct arrangement 22 and the fourth throttle duct arrangement 23 to the respectively associated chambers 6, 7 and 8, 9, two axial depressions 28, 29 and 30, 31 are cut out in the axial end faces of the second bearing component 3. Moreover, in the example embodiment of the present invention illustrated in FIGS. 2 and 3, axial depressions 32, 33 and 34, 35 are formed on the axially inner face of the cover 11 and may be arranged congruently to the abovementioned depressions 28 to 31 of the second bearing component 3. For example, the depressions 28 and 32 connect the third throttle duct arrangement 22 to the chamber 7 of the second quadrant Q2, while the depressions 30 and 35 couple the third throttle duct 22 to the chamber 6 of the first quadrant Q1. Correspondingly, the depressions 29 and 33 connect the fourth throttle duct 23 to the chamber 8 of the third quadrant Q3, while the depressions 31 and 34 couple the fourth throttle duct 23 to the chamber 9 of the fourth quadrant Q4.

The elastomeric bearing 1 illustrated in FIG. 1 operates as follows:

In the event of a load parallel to the Z-axis, which is indicated by an arrow 36, for example, the second bearing component 3 is adjusted upwardly relative to the bearing component 2. At the same time, the volumes of the chambers 7 and 8 are reduced, while the volumes of the chambers 6 and 9 are simultaneously increased. In this case, damping medium may flow from the chamber 7 into the chamber 6 via the third throttle duct arrangement 22, while damping medium flows from the chamber 8 into the chamber 9 via the fourth throttle duct arrangement 23. By virtue of the configuration of the throttle duct arrangements 22 and 23, the exchange of damping medium occurs in a correspondingly throttled or damped manner, so that the adjusting movement between the second bearing component 3 and the first bearing component 2 is also damped accordingly.

In the event of a load on the elastomeric bearing 1 parallel to the X-axis, which is indicated by an arrow 37, for example, the volumes of the chambers 6 and 7 are reduced, while the volumes of the chambers 8 and 9 simultaneously increase. The exchange of damping medium then occurs via the first throttle duct arrangement 20 and via the second throttle duct arrangement 21. A transmission of force or a transmission of movement between the two bearing components 2 and 3 occurs in a correspondingly damped manner as a function of the throttling action of the throttle duct arrangements 20 and 21. The two axial directions X and Z represent the main working directions of the elastomeric bearing 1. Relative adjustments, which have both components parallel to the Z-axis and components parallel to the X-axis, are correspondingly damped. Thus, all forces which act on the elastomeric bearing 1 or relative movements which occur between the components 2 and 3 are damped as soon as one of the associated direction components is in the XZ-plane.

The throttle duct arrangements 22 and 23 active for achieving the damping action in the direction of the Z-axis may have different throttle resistances from the throttle duct arrangements 20 and 21 active for achieving damping in the direction of the X-axis. A two-dimensional damping behavior of the elastomeric bearing 1 which is suitable for the respective application may be implemented in this manner.

In the example embodiment of the present invention illustrated in FIG. 3, in contrast to that illustrated in FIG. 1, there is no disc 17 (cf. FIG. 1) arranged axially between the cover 11 and the respectively associated axial end of the second bearing component 3 or of the connecting body 5.

In the example embodiment of the present invention illustrated in FIGS. 2, 3 and 4, the third throttle duct arrangement 22 is configured as a cylindrical orifice 38 which is introduced into the insertion part 24. In contrast, the fourth throttle duct arrangement 23 is composed of two throttle ducts, e.g., a first throttle duct 39 and a second throttle duct 40, which connect the two associated chambers 8 and 9 to one another.

Figure 5:
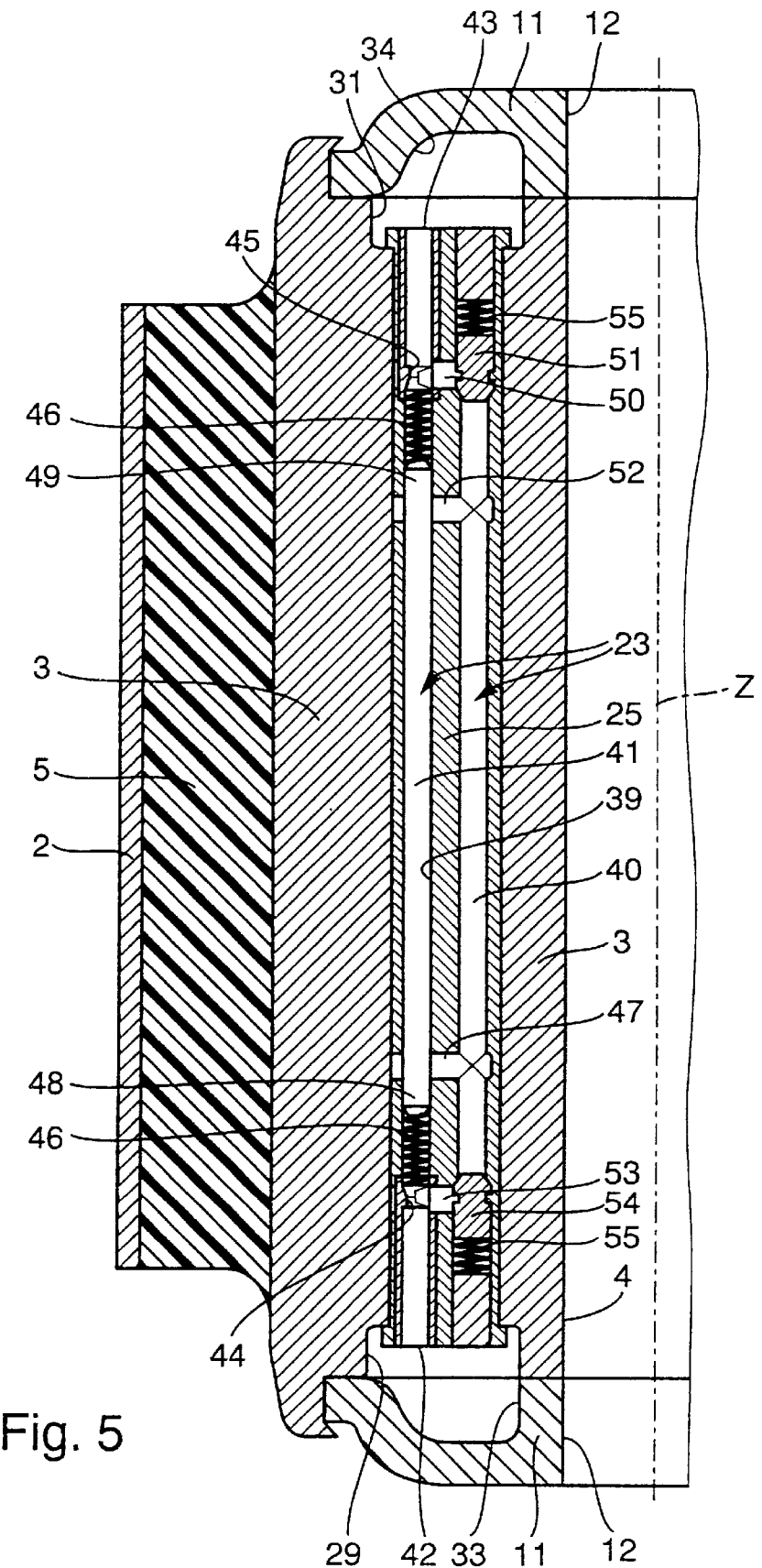
FIG. 5 is a schematic longitudinal cross-sectional view of a further example embodiment of an elastomeric bearing according to the present invention.

As illustrated in FIGS. 3 and 5, these two throttle ducts 39 and 40 of the fourth throttle duct arrangement 23 are introduced into the insertion element 25, and they extend parallel to one another therein. The throttle ducts 39 and 40 are formed by cylindrical orifices, e.g., bores. However, the present invention is not restricted to this shape of the throttle ducts 39 and 40.

The first throttle duct 39 includes an absorber 41 which is configured as a cylindrical bar. The outer cross-section of this absorber 41 corresponds approximately to the inner cross-section of the first throttle duct 39, although sufficient radial play is provided for the absorber 41 to be adjustable relatively freely in the first throttle duct 39. For example, the absorber 41 includes at least three webs, which are arranged symmetrically on the circumference, project radially outwardly from the latter and extend axially along the absorber 41 and which result in radial centering of the absorber 41 in the first throttle duct 39. The first throttle duct 39 issues at its axial ends 42 and 43 into the depressions 29, 33 and 31, 34 and thus communicates with the chambers 8 and 9 assigned to the fourth throttle duct arrangement 23. The absorber 41 is adjusted as a function of pressure differences which are formed between the chambers 8 and 9 in the event of loads on the elastomeric bearing 1 and which act at axial ends 48 and 49 of the absorber 41. The absorber 41 may be configured so that an exchange of damping medium between the two chambers 8 and 9 may occur via the first part-duct 39 by the flow passing around the absorber 41.

The absorber 41 may narrow the opening cross-section of the first throttle duct 39 to an extent such that virtually no appreciable exchange of damping medium may occur through the first throttle duct 39.

In the first throttle duct 39, limit stops 44 and 45 are provided, which limit the adjusting movements of the absorber 41. In the example embodiment of the present invention illustrated in FIG. 5, helical springs 46 are supported in the region of the stops 44 and 45, the helical springs centering with the absorber 41 axially and prestressing the latter into an initial position which is illustrated in FIGS. 3 and 5.

The second throttle duct 40 includes a first inlet orifice 47 which is connected to the first throttle duct 39 in the region of the first axial end 48 of the absorber 41. This first axial end 48 is assigned to the lower chamber 8 (cf.

FIG. 1) as illustrated in FIGS. 3 and 5. When the absorber 41 is in the initial position illustrated, the first axial end 48 or a corresponding axial end portion 48 covers the first inlet orifice 47, with the result that the latter is closed.

The absorber 41 is adjusted on account of pressure differences between the chambers 8 and 9 assigned to its axial ends 48 and 49. In the case of a sufficient excess pressure, for example, in the lower chamber 8 in relation to the upper chamber 9, therefore, the absorber 41 is adjusted upwardly and may free the first inlet orifice 47 to a greater or lesser extent. When the upper stop 45 is reached, the first inlet orifice 47 is opened completely.

Moreover, the second throttle duct 40 includes a first outlet orifice 50 which is likewise connected to the first throttle duct 39. However, the connection of the first outlet orifice 50 to the first throttle duct 39 is made at a point which is located outside the range of adjustment of the absorber 41, so that the first outlet orifice 50 is not covered by the absorber 41 in any adjustment position of the absorber 41. The first outlet orifice 50 is located approximately level with the upper stop 45. In the region of the first outlet orifice 50 is arranged a first non-return valve 51 which, moreover, is configured as a pressure-regulating valve. This first non-return valve 51 or pressure-regulating valve 51 blocks a flow through the second throttle duct 40 from its first outlet orifice 50 to its first inlet orifice 47. In the case of a sufficient excess pressure in the first inlet orifice 47 in relation to the first outlet orifice 50, the first valve 51 opens and allows a flow through the second throttle duct 40 from its first inlet orifice 47 to its first outlet orifice 50.

Correspondingly, the second throttle duct 40 is equipped with a second inlet orifice 52, a second outlet orifice 53 and a second non-return valve 54. The second inlet orifice 52 is connected to the first throttle duct 39 in the region of the second axial end 49 of the absorber 41, the second axial end 49 or a corresponding axial end portion 49 overlapping and thus closing the second inlet orifice 52 when the absorber 41 is in the initial position illustrated. The second inlet orifice 52 is also closed to a greater or lesser extent, and therefore controlled, by the absorber 41 as a function of the adjusting movements of the absorber 41.

The second outlet orifice 53 likewise issues into the first throttle duct 39, approximately level with the lower stop 44, outside the range of adjustment of the absorber 41. The second non-return valve 54 is configured as an excess-pressure valve which allows a flow through the second throttle duct 40 from the second inlet orifice 52 to the second outlet orifice 53 only in the case of a sufficient excess pressure in the second inlet orifice 52 in relation to the second outlet orifice 53. A reversed throughflow from the second outlet orifice 53 to the second inlet orifice 52 is blocked by the second non-return valve 54.

The non-return function or the excess-pressure regulating function of the valves 51 and 54 is achieved, for example, by corresponding spring device 55 which prestresses the respective valve 51 and 54 into its closing position.

The fourth throttle duct arrangement 23 illustrated in FIGS. 3 and 5 operates as follows:

In the event of a load on the elastomeric bearing 1 parallel to its longitudinal axis Z, there may, for example, be a relative adjustment between the second bearing component 3 and the first bearing component 2, during which the second bearing component 3 moves upwardly relative to the first bearing component 2 as illustrated in FIG. 5. Correspondingly, the volume of the lower chamber 8 is reduced, while the volume of the upper chamber 9 is increased. The damping medium in the lower chamber 8 is thereby compressed and the pressure rises. The damping medium or the excess pressure arrives via the depressions 39 and 33 at the axial end of the first throttle duct 39, so that the excess pressure of the lower chamber 8 prevails both at the second outlet orifice 53 and at the absorber 41. The absorber 41 is adjusted upwardly counter to the upper spring 46. In the event of lower pressure differences, i.e., in the event of smaller adjusting movements of the absorber 41, the inlet orifices 47 and 52 of the second throttle duct 40 remain closed. In this case, the non-return valves 51 and 54 prevent the ingress of damping medium into the second throttle duct 40 and its outlet orifices 50 and 53. An exchange of damping medium between the chambers 8 and 9 does not occur when the absorber 41 closes relatively tightly. The mass of the absorber 41, which is co-adjusted during relative movements between the second bearing component 3 and the first bearing component 2, results in a reinforcement of the damping effect of the elastomeric bearing 1.

When the pressure in the lower chamber 8 rises further, the absorber 41 may be adjusted as far as an upper stop 45. Then, at the latest, the first inlet orifice 47 of the second throttle duct 40 is opened completely. The pressure of the lower chamber 8 also prevails at the first non-return valve 51 when the first inlet orifice 47 is opened to a greater or lesser extent. As soon as the excess pressure of the lower chamber 8 exceeds the regulating pressure of the first non-return valve 51, the latter opens and allows a flow through the second throttle duct 40 from its first inlet orifice 47 to its first outlet orifice 50. The damping medium passes from the first outlet orifice 50 via the first throttle duct 39 into the depressions 31 and 34 and from these into the upper chamber 9.

Accordingly, in the event of relatively low loads, the elastomeric bearing 1 according to the present invention operates with the absorber 41, only relatively small relative movements being possible between the first bearing component 2 and the second bearing component 3. In the event of higher loads, the second throttle duct 40 is activated as a result of a sufficient adjustment of the absorber 41, so that a throttled exchange of damping medium may occur between the chambers 8 and 9 connected to one another. In the event of higher loads, greater relative adjustments within the second bearing component 3 and the first bearing component 2 are then also possible. With the aid of the configuration according to the present invention of this fourth throttle duct arrangement 23, the elastomeric bearing 1 may be configured for a specific load characteristic.

When the elastomeric bearing 1 is subjected to load in reverse, so that an excess pressure occurs in the upper chamber 9 in relation to the lower chamber 8, the fourth throttle duct arrangement 23 behaves in a correspondingly similar way.

In an example embodiment of the present invention as illustrated in FIG. 1 which includes a disc 17, this disc 17 may close axially the depressions 32, 33, 34, 35 which are formed in the cover 11. The disc 17 includes two orifices 55 and 56 for each of these depressions 32 to 35, one orifice 55 communicating with the respectively associated chamber 6 or 9 or 7 or 8, while the other orifice 56 is connected to a throttle duct arrangement 22 or 23 assigned to this chamber 6 to 9.

In the example embodiment of the present invention, only the fourth throttle duct arrangement 23 is composed of two throttle ducts 39 and 40, whereas, for example, the third throttle duct arrangement 22 is conventionally configured. An example embodiment of the present invention is also possible, in which the first throttle duct arrangement 20 and/or the second throttle duct arrangement 21 and/or the third throttle duct arrangement 22 and/or the fourth throttle duct arrangement 23 are composed of two throttle ducts 39 and 40.

Although the elastomeric bearing 1 includes four chambers 6 to 9 in the example embodiment illustrated, the configuration according to the present invention of the fourth throttle duct arrangement 23 may also be used in an elastomeric bearing 1 which includes only two chambers connected to one another via a single throttle duct arrangement.

What is claimed is:

1. A hydraulically damping elastomeric bearing for a mounting in a motor vehicle, comprising:
   a first bearing component;
   a second bearing component;
   an elastic connecting body arranged between the first bearing component and the second bearing component and elastically connecting the first bearing component and the second bearing component;
   two chambers filled with a liquid damping medium; and
   at least two throttle ducts, the two chambers communicating with each other via the at least two throttle ducts;

wherein a first throttle duct includes an absorber, the absorber being adjusted in accordance with a pressure difference between the two chambers in the first throttle duct, the absorber being configured to control an opening cross-section of a second throttle duct in accordance with an adjusting movement.

2. The elastomeric bearing according to claim 1, wherein the second throttle duct includes a first inlet orifice corresponding to a first chamber and a first outlet orifice corresponding to a second chamber, the first inlet orifice being connected to the first throttle duct and being controlled by the absorber.

3. The elastomeric bearing according to claim 2, wherein the second throttle duct includes a second inlet orifice corresponding to the second chamber and a second outlet orifice corresponding to the first chamber;

wherein the second inlet orifice is connected to the first throttle duct and is controlled by the absorber;

wherein the absorber is configured to maintain the first inlet orifice open and the second inlet orifice closed in response to a sufficient excess pressure in the first chamber and to maintain the first inlet orifice closed and the second inlet orifice open in response to a sufficient excess pressure in the second chamber;

wherein the first outlet orifice includes a first non-return valve configured to block a flow through the second throttle duct from the first outlet orifice to the first inlet orifice and to allow a flow from the first inlet orifice to the first outlet orifice; and wherein the second outlet orifice includes a second non-return valve configured to block a flow through the second throttle duct from the second outlet orifice to the second inlet orifice and to allow a flow form the second inlet orifice to the second outlet orifice.

4. The elastomeric bearing according to claim 2, further comprising a third throttle duct connecting the two chambers in parallel to the first throttle duct and the second throttle duct, the third throttle duct including a second inlet orifice corresponding to the second chamber and a second outlet orifice corresponding to the first chamber;

wherein the second inlet orifice is connected to the first throttle duct and is controlled by the absorber; and wherein the absorber is configured to maintain the first inlet orifice open and the second inlet orifice closed in response to a sufficient excess pressure in the first chamber and to maintain the first inlet orifice closed and the second inlet orifice open in response to a sufficient excess pressure in the second chamber.

5. The elastomeric bearing according to claim 4, wherein the first outlet orifice includes a first non-return valve configured to block a flow through the second throttle duct from the first outlet orifice to the first inlet orifice and to allow a flow from the first inlet orifice to the first outlet orifice; and wherein the second outlet orifice includes a second non-return valve configured to block a flow through the third throttle duct from the second outlet orifice to the second inlet orifice and to allow a flow from the second inlet orifice to the second outlet orifice.

6. The elastomeric bearing according to claim 3, wherein at least one of the first non-return valve and the second non-return includes an excess-pressure valve and is configured to allow a flow through the respective throttle duct from the respective inlet orifice to the corresponding outlet orifice only in response to a predetermined excess pressure on an inlet side.

7. The elastomeric bearing according to claim 5, wherein at least one of the first non-return valve and the second non-return valve includes an excess-pressure valve and is configured to allow a flow through the respective throttle duct from the respective inlet orifice to the corresponding outlet orifice only in response to a predetermined excess pressure on an inlet side.

8. The elastomeric bearing according to claim 3, wherein the first inlet orifice issues into the first throttle duct within a range of adjustment of a first end portion of the absorber corresponding to the first chamber, a throughflow opening cross-section of the first inlet orifice being controlled in accordance with a greater or lesser overlap by the first end portion.

9. The elastomeric bearing according to claim 8, wherein the second outlet orifice issues into the first throttle duct within a range of adjustment of a second end portion of the absorber corresponding to the second chamber, a throughflow opening cross-section of the second inlet orifice being controlled in accordance with a greater or lesser overlap by the second end portion.

10. The elastomeric bearing according to claim 1, wherein the absorber is prestressed into an initial position by a spring device.

11. The elastomeric bearing according to claim 3, wherein the absorber is prestressed into an initial position by a spring device; and wherein in the initial position, the absorber closes both inlet orifices.

12. The elastomeric bearing according to claim 4, wherein the absorber is prestressed into an initial position by a spring device; and wherein in the initial position, the absorber closes both inlet orifices.

13. The elastomeric bearing according to claim 3, wherein the absorber is configured to close at least one of the first inlet orifice and the second inlet orifice at least in response to a pressure equilibrium between the two chambers.

14. The elastomeric bearing according to claim 4, wherein the absorber is configured to close at least one of the first inlet orifice and the second inlet orifice at least in response to a pressure equilibrium between the two chambers.

15. The elastomeric bearing according to claim 2, wherein the first outlet orifice is connected to the first throttle duct, the first outlet orifice issuing into the first throttle duct outside a range of adjustment of a second end portion of the absorber corresponding to the second chamber.

16. The elastomeric bearing according to claim 3, wherein the second outlet orifice is connected to the first throttle duct, the second outlet orifice issuing into the first throttle duct outside a range of adjustment of a first end portion of the absorber corresponding to the first chamber.

* * * * *